United States Patent [19]  
Nomura et al.

[11] Patent Number: 4,498,571  
[45] Date of Patent: Feb. 12, 1985

[54] PALLET CHANGER

[75] Inventors: Kenji Nomura, Aichi; Tetsuro Yamakage, Anjo; Katsuyoshi Noro, Kariya, all of Japan

[73] Assignee: Toyoda Koki Kabushiki Kaisha, Kariya, Japan

[21] Appl. No.: 386,671

[22] Filed: Jun. 9, 1982

[30] Foreign Application Priority Data

Aug. 19, 1981 [JP] Japan .................... 56-121771[U]

[51] Int. Cl.$^3$ ............................................ B65G 47/00
[52] U.S. Cl. .................................... 198/339; 198/472; 198/345; 29/33 P
[58] Field of Search ............... 198/339, 346, 472, 345, 198/648; 29/33 P, 563, 568; 414/744 R, 589, 590, 751, 101, 750; 269/25, 26, 56

[56] References Cited

U.S. PATENT DOCUMENTS

| | | | |
|---|---|---|---|
| 3,054,333 | 9/1962 | Brianard et al. | 90/56 |
| 3,825,245 | 7/1974 | Osburn et al. | 198/472 |
| 4,148,400 | 4/1979 | Cross | 198/472 |
| 4,172,512 | 10/1979 | Clegg et al. | 198/339 |
| 4,181,211 | 1/1980 | Nishimura et al. | 198/339 |
| 4,201,284 | 5/1980 | Brems | 198/472 |
| 4,217,978 | 8/1980 | Stalker | 198/472 |
| 4,253,559 | 3/1981 | Myers et al. | 198/345 |

FOREIGN PATENT DOCUMENTS

| | | | |
|---|---|---|---|
| 1255419 | 12/1971 | United Kingdom | 198/472 |
| 2092923 | 8/1982 | United Kingdom | 198/339 |

Primary Examiner—Leslie J. Paperner  
Assistant Examiner—Daniel R. Alexander  
Attorney, Agent, or Firm—Oblon, Fisher, Spivak, McClelland & Maier

[57] ABSTRACT

A pallet changer for a machine tool is provided wherein a pallet clamper for guiding a work pallet during transfer movements onto and away from a rotary table of the machine tool is supported at its center portion and vertically movable by a hydraulic cylinder. This cylinder moves the clamper up to unclamp the pallet from the rotary table prior to the transfer movements and moves the clamper down to clamp the pallet on the rotary table upon completion of the transfer movement onto the rotary table. Auxiliary hydraulic cylinders are further provided at either end portions in a pallet transfer direction of the clamper and between the rotary table and the clamper for auxiliarily supporting the clamper while the pallet is unclamped, so that the clamper can be prevented from being deformed due to the weight of a mass of the pallet and workpiece supported only by the clamper during such time.

4 Claims, 3 Drawing Figures

PALLET CHANGER

BACKGROUND OF THE INVENTION

1. Field of the Invention

The present invention relates in general to a machine tool and more particularly to a pallet changer for selectively transferring workpiece set up pallets onto and from a work table of the machine tool.

2. Description of the Prior Art

Heretofore, there has been used a pallet loading and unloading device for exclusive use in loading a workpiece set up pallet onto a work table and unloading it from the table of a machine tool. The work table is provided thereon with a pallet clamper for guiding the pallet during loading and unloading operations as well as for clamping it on the work table. The clamper is connected with a piston of a clamping cylinder device which is disposed at the center portion of the work table. The clamper, when in a lifted-up position for unclamping the pallet in advance of loading and unloading operations, is brought into support only at its center position, and its opposite end portions in a pallet transfer direction are brought into an overhung situation without support.

For this reason, at the time of loading and unloading operations when the weight of the pallet mass and a workpiece set up thereon is loaded on one of the opposite end portions of the clamper without support, then the clamper is deformed to have a level different from that of a pallet rest of the loading and unloading device. The heavier the weight of a pallet and a workpiece handled in such a machine tool the greater the problems created. Accordingly, difficulties may occur when the pallet is transferred between the work table and the pallet rest.

SUMMARY OF THE INVENTION

It is therefore an object of the present invention to provide a new and improved pallet changer capable of preventing a pallet clamper from being deformed due to the weight of a mass of a work pallet and a workpiece which are supported only by the pallet clamper during the transfer operations of the work pallet onto and from a machine tool table, so that reliable loading and unloading operations can be realized.

Briefly, according to the present invention, there is provided a pallet changer for a machine tool, which comprises a loading and unloading device for transferring a workpiece set up pallet onto and from a machine tool table and a pallet clamper provided on the table and connected with a main support and operating mechanism. The clamper guides the pallet when the same is transferred onto and from the table in a horizontal direction. The mechanism, upon completion of the loading of the pallet onto the table, moves the clamper down toward the table so as to clamp the pallet on the table and prior to the unloading of the pallet from the table, moves the clamper up from the table so as to unclamp the pallet from the table. An auxiliary support and operating mechanism is further provided between the clamper and the table. While the pallet is unclamped from the table, this auxiliary mechanism operates synchronously with the operation of the main support and operating mechanism and auxiliarily supports the clamper against the weight of a mass of the pallet and a workpiece set up thereon, whereby the clamper can be prevented from deforming.

BRIEF DESCRIPTION OF THE DRAWINGS

The foregoing and other objects and many of the attendant advantages of the present invention will readily be appreciated as the same becomes better understood by reference to the following detailed description when considered in connection with the accompanying drawings, wherein like reference numerals designate like or corresponding parts throughout the several views, and in which.

DETAILED DESCRIPTION OF THE PREFERRED EMBODIMENT

Figure 1:
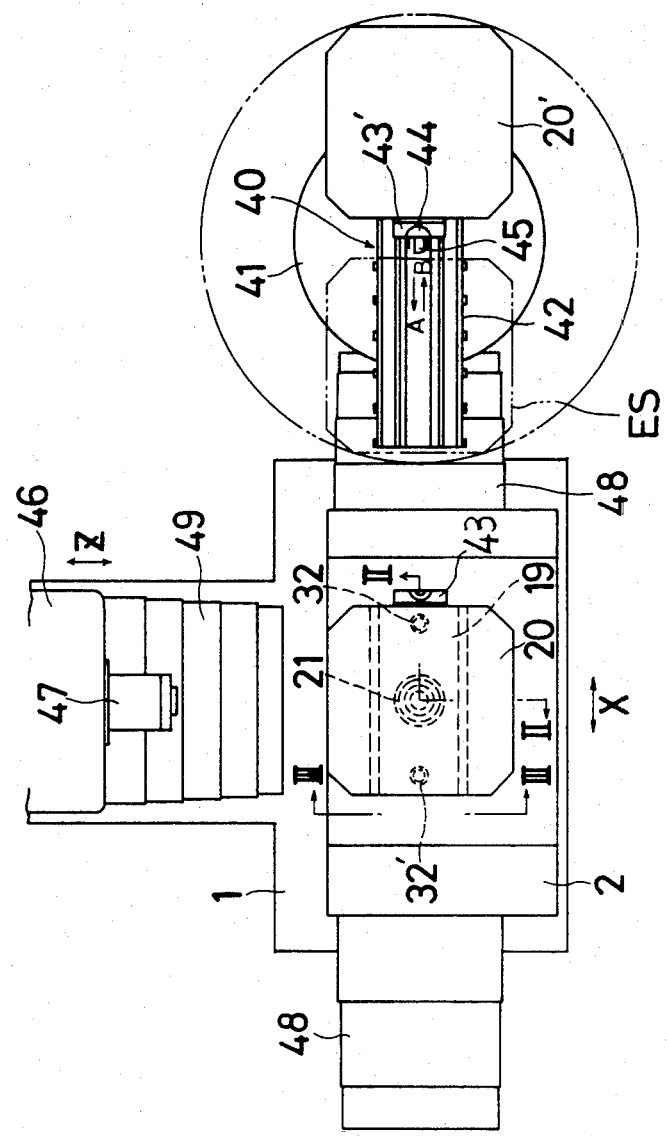
FIG. 1 is a schematic plan view of a machine tool with a pallet changer according to the present invention.
Figure 2:
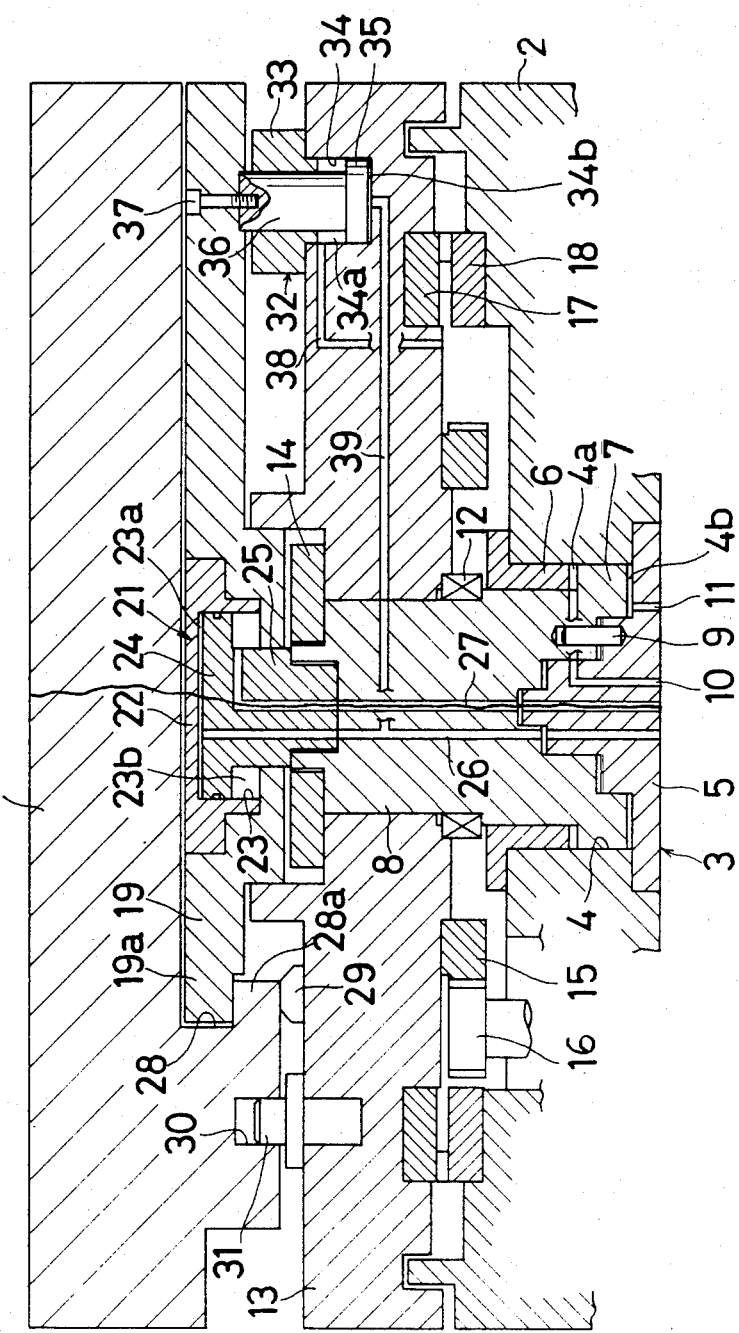
FIG. 2 is an enlarged cross-sectional view of the apparatus, taken along the line II—II in FIG. 1.

Referring now to the drawings and particularly to FIGS. 1 and 2 thereof, there is shown a machine tool base 1, on which a feed table 2 is slidably mounted for movement in an X-axis direction indicated by the arrow X. Under the center portion of the feed table 2, a table lift cylinder 3 is provided for effecting upward and downward movements of a rotary table 13. The cylinder 3 comprises a head cap 5 and a rod cap 6 respectively closing the lower and upper end openings of a cylindrical bore 4, a piston 7 vertically slidably received in the cylindrical bore 4, a piston rod 8 upwardly extending through the rod cap 6, and a pin 9 preventing the rotation of the piston 7. An upper cylinder chamber 4a for clamping motion and a lower cylinder chamber 4b for unclamping motion, partitioned by the piston 7, are in fluid communication with a change-over valve, not shown, through fluid passages 10 and 11 formed in the head cap 5 so as to receive pressurized fluid from a fluid supply, also not shown.

The rotary table 13 is supported at its center portion on the piston rod 8 through a thrust bearing 12 only for rotation relative to the piston rod 8 in a horizontal plane. A clamp member 14 for clamping the rotary table 13 is secured to the upper end of the piston rod 8 extending through the rotary table 13. An indexing gear 15 is secured to the lower surface of the rotary table 13 in a co-axial relationship with the piston rod 8 and is in mesh with a pinion 16. The rotary table 13 can therefore be indexed to any desired angular position by rotating the pinion 16 by a drive device, not shown. Further, a pair of gear couplings 17 and 18, disconnectable from each other, are secured respectively to a lower surface of the rotary table 13 and an upper surface of the feed table 2 in co-axial alignment with the piston rod 8. When the hydraulic cylinder 3 causes the rotary table 13 to take its elevated position, the gear couplings 17 and 18 are disengaged from each other so as to permit rotation of the rotary table 13 brought about by the rotation of the pinion 16. When the hydraulic cylinder 3 causes the rotary table 13 to move down, the gear couplings 17 and 18 come to engagement with each other to thereby prevent the rotation of the rotary table 13, which is then securely clamped upon the feed table 2 as a result of being positively pressed down by means of the clamp member 14.

Still in FIGS. 1 and 2, a reference numeral 19 denotes a pallet clamper, which has functions of clamping on a work pallet 20, as a work table, and unclamping it from the rotary table 13 and further, of guiding the work pallet 20 during loading and unloading operations. The pallet clamper 19, taking the form of a rectangular plate, is horizontally supported over the rotary table 13 to be vertically movable by a pallet clamping cylinder 21. This cylinder 21 comprises a cylinder liner 22 embedded in the center portion of the pallet clamper 19, a piston 24 vertically slidable within a cylinder chamber 23 formed in the cylinder liner 22, and a piston rod 25 formed bodily with the piston 24 and projecting from the lower surface of the pallet clamper 19. The projecting end portion of the piston rod 25 is integrally connected to the top of the piston rod 8 of the rotary table lift cylinder 3, so that the pallet clamper 19 is supported over the rotary table 13. Upper and lower chambers 23a and 23b partitioned by the piston 24 respectively for unclamping and clamping motions are in fluid communication respectively with passages 26 and 27, which are formed passing through the head cap 5 and the piston rod 8 of the rotary table lift cylinder 3 and further through the piston rod 25 and the piston 24 of the pallet clamping cylinder 21. The passages 26 and 27 are, in turn, in fluid communication with a change-over valve, not shown, by which pressurized fluid is delivered from the fluid supply to the upper and lower chambers 23a and 23b.

Figure 3:
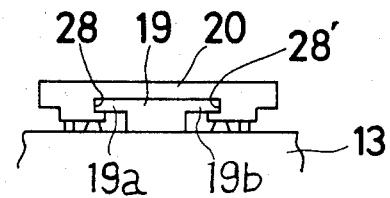
FIG. 3 is a side view of the apparatus as viewed from the direction indicated by the arrows III—III in FIG. 1.

The work pallet 20 is capable of being mounted on the clamper 19 with contact therewith. As best shown in FIG. 3, the work pallet 20 is formed at its lower surface with T-slot ways 28 and 28' and the pallet clamper 19 is formed at its opposite sides in a shorter width direction with a pair of longitudinal guides 19a and 19b fittable respectively into the T-slot ways 28 and 28'. Therefore, the work pallet 20 can be guided to be movable horizontally in a longitudinal direction of the pallet clamper 19. A pair of ledges 28a and 28b forming the T-slot ways 28 and 28' also operate as those portions clamped by the longitudinal guides 19a and 19b through engagements with the lower surfaces of the same. In order to establish the vertical position of the work pallet 20, the rotary table 13 is securely provided with a number of reference seat members 29 respectively at portions of its upper surface facing the ledges 28a and 28b. In order to further establish the position of the work pallet 20 in horizontal X- and Z-axis directions, a reference hole 30 is formed on the lower surface of the work pallet 20, while a locating pin 31 fittable into the reference hole 30 is secured to the rotary table 13 to protrude from the upper surface thereof.

Auxiliary support cylinders 32 and 32' of the same configuration are provided for preventing deformation of the pallet clamper 19 which may otherwise be caused by the weight of the work pallet 20 and a workpiece mounted thereon, by auxiliarily supporting the pallet clamper 19 during loading and unloading of the work pallet 20. These cylinders 32 and 32' are disposed in the vicinities of the longitudinal opposite end portions of the pallet clamper 19, as shown in FIG. 1, and between the rotary table 13 and the pallet clamper 19. Each of the cylinders 32 and 32' is constructed by a cylinder chamber 34 formed in the rotary table 13 to a desired depth from the upper surface of the rotary table 13 and closed by a rod guide 33 at its upper opening portion, a piston 35 vertically slidably received in the chamber 34 and a piston rod 36 provided bodily with the piston 35.

The piston rod 36 extends passing through the rod guide 33 to the lower surface of the pallet clamper 19 to be connected therewith by means of a bolt 37. An upper chamber 34a of the cylinder chamber 34 partitioned by the piston 35 is connected with the atmospheric pressure via passage 38, while a lower chamber 34b of the chamber 34 is connected via a passage 39 with the passage 26 which is in communication with the upper chamber 23a of the pallet clamping cylinder 21.

Generally indicated by a numeral 40 in FIG. 1 is a known pallet loading and unloading device disposed at the right of the base 1. The device 40 comprises a support base 41, a pallet guide swivel 42 horizontally rotatable thereon by an indexing mechanism, not shown, and a stationary hook 44 fixedly provided on the support base 41 and engageable with hook connectors 43 and 43' respectively secured to the pallet 20 and another pallet 20' which is to be loaded onto the rotary table 13 in alternative manner with the pallet 20. The function of the stationary hook 44 is to immovably hold the pallet 20 and 20' except for any one of them which occupies an exchange station indicated by the phantom line ES, through engagement with the hook connectors 43 and 43'. The device 40 further comprises a movable hook 45, which is reciprocatively movable by a hook driver, not shown, in the longitudinal direction of the swivel 42 for selectively transferring the pallets 20 and 20' between the exchange station ES and the rotary table 13. Also indicated in FIG. 1 is a column 46, which is movable on the machine base 1 along a horizontal Z-axis transverse to the moving direction of the feed table 2. A spindle head 47 is mounted to be movable on the front surface of the column 46 in a vertical Y-axis direction. Numerals 48 and 49 denote chip covers, which protect guide ways for the feed table 2 and the column 46, respectively.

The operation of the apparatus as constructed above will now be described. The exchange operation of the pallet 20 and 20' (hereinafter referred to as first and second pallets) between the exchange station ES and the rotary table 13 starts from a 180-degree rotation of the swivel 42 to thereby bring nearby the rotary table 13 one end portion of the swivel 42 which none of the first and second pallets 20 and 20' occupies as shown in FIG. 1. Pressurized fluid is then supplied via the fluid passage 11 into the lower chamber 4b of the rotary table lift cylinder 3. This causes the coupling gear 17 to be disengaged from the coupling gear 18 through the lift-up motion of the rotary table 13. The subsequent rotation of the pinion 16 brings the rotary table 13 to such an angular position that the first pallet 20 now on the rotary table 13 is made ready for unloading operation, as shown in FIG. 1.

Through the change-over valve, not shown, which at this time, connects the fluid passages 26 and 27 respectively to the fluid supply and the reservoir thereof, pressurized fluid is then supplied into the upper chamber 23a of the pallet clamping cylinder 21 to lift the clamper 19 up by a stroke S1 of the cylinder 21. As the ledges 28a are relieved of clamping by the longitudinal guides 19a of the clamper 19 upon the reference seat members 29, together with disengagement of the reference hole 30 from the pin 31, the first pallet 20 is put in the condition that it can move relative to the clamper 19. Simultaneously, pressurized fluid led by means of the fluid passage 26 flows via the fluid passage 39 into the lower chamber 34b of the auxiliary support cylinder 32. Therefore, the piston 35 of the cylinder 32 is moved up by its stroke S2 (S2=S1) and supports one of the longitudinal overhang portions of the clamper 19 from below. In the same manner, the corresponding piston, not shown, of the other auxiliary support cylinder 32' supports the other of the longitudinal overhang portions of the clamper 19 from below.

The feed table 2 is then moved to one end of its movement toward the swivel 42, whereafter the movable hook 45 is moved toward one direction indicated by the arrow A in FIG. 1. After engagement with the hook connector 43 of the first pallet 20 on the rotary table 13, the movable hook 45 is returned toward the other direction indicated by the arrow B in FIG. 1, whereby the first pallet 20 on the rotary table 13 is transferred therefrom onto the exchange station ES of the swivel 42, as shown by the phantom line in FIG. 1. In this situation, the swivel 42 is in coincidence with the clamper 19 in height, with the longitudinal overhang portions of the clamper 19 being supported by the auxiliary support cylinders 32 and 32 from below. Accordingly, the clamper 19 is prevented from deformation attributed to the weight of a mass of the pallet 20 and a workpiece thereon even when the mass is loaded on one of the longitudinal overhang portions of the clamper 19.

Upon completion of unloading the first pallet 20 from the rotary table 13 onto the swivel 42, the swivel 42 is rotated from the position shown in FIG. 1 through an angle of 180-degrees to thereby face the second pallet 20' on which an unprocessed workpiece has been set up, with the clamper 19 being in the unclamping position. Thereafter, the movable hook 45 is moved toward the direction indicated by the arrow A, whereby the second pallet 20' is transferred from the swivel 42 onto the clamper 19. Following this, the fluid passages 26 and 27 are connected by the operation of the changeover valve, not shown, respectively to the reservoir and the fluid supply, and downward movement of the clamper 19 results from flow of pressurized fluid into the lower chamber 23b of the pallet clamping cylinder 21. This causes the second pallet 20' to be put in place on the rotary table 13 through the engagement between the reference hole 30 and the pin 31 and then to be clamped upon the rotary table 13 with the longitudinal ledges 28a being pressed upon the reference seat members 29. At this time, the pistons 35 of the auxiliary support cylinders 32 and 32' are moved down to the position indicated in FIG. 2 together with the downward movement of the clamper 19. Subsequently, the feed table 2 is displaced into a machining operation area where the second pallet 20' comes before the spindle head 47. Precise positionings of the rotary table 13 and the feed table 2 are then performed so that required machining operations will be effected on the workpiece on the second pallet 20'.

It is understood that contrary to being provided at either end portions of the clamper, such auxiliary support means may be provided only at one of the end portions which itself supports the entire weight of a mass of the work pallet and the workpiece set up thereon at the time of loading and unloading operations. However, in the case that such auxiliary support means is provided at each of the end portions of the clamper, it is desirable to provide such auxiliary support means with additional means for preventing such auxiliary support means from excessively supporting the clamper.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A pallet changer for a machine tool having a work pallet for setting up a workpiece thereon and a rotary table capable of removably supporting said work pallet thereon, comprising:

loading and unloading means for loading said work pallet onto, and unloading the same from said rotary table;

a pallet clamper having a rectangular shape and adapted to guide said work pallet in a longitudinal direction thereof when the same is horizontally transferred by said loading and unloading means onto and from said rotary table, said pallet clamper being vertically movable for clamping said work pallet on, and unclamping the same from said rotary table;

main support and operating means rotatably carrying said rotary table thereabout and including a first hydraulic cylinder device connected with the center portion of said pallet clamper for vertically supporting and moving said pallet clamper so as to clamp said work pallet on, and unclamp the same from said rotary table; and auxiliary support and operating means disposed between said rotary table and said pallet clampler and including a second hydraulic cylinder device vertically operable synchronously with the operation of said first hydraulic cylinder device for auxiliarily supporting at least one longitudinal opposite end portion of said pallet clamper while said work pallet is unclamped from said rotary table.

2. A pallet changer as set forth in claim 1, wherein said second hydraulic cylinder device comprises:

a piston received in a cylinder chamber formed in said rotary table for vertical movement and bodily connected with said pallet clamper for preventing the same from rotating relative to said rotary table about the rotational axis of said rotary table.

3. A pallet changer as set forth in claim 2, further comprising:

a feed table mounting thereon said main support and operating means and linearly movable toward and away from said loading and unloading means for presenting said pallet clamper by said loading and unloading means during a pallet transfer operation.

4. A pallet changer as set forth in claim 3, wherein said main support and operating means further comprises:

a support rod mounted on said feed table for rotatably supporting said rotary table and incorporating said first hydraulic cylinder device.

* * * * *